(12) United States Patent
Haines

(10) Patent No.: US 7,142,324 B2
(45) Date of Patent: Nov. 28, 2006

(54) SENSING MEDIA PARAMETER INFORMATION FROM MARKED SHEETS

(75) Inventor: Robert B. Haines, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 09/981,275

(22) Filed: Oct. 17, 2001

(65) Prior Publication Data

US 2003/0095811 A1 May 22, 2003

(51) Int. Cl.
*G06K 1/00* (2006.01)
(52) U.S. Cl. ............. 358/1.16; 347/107; 399/389
(58) Field of Classification Search .......... 358/1.6, 358/1.15, 1.16; 347/107; 399/389
See application file for complete search history.

(56) References Cited

U.S. PATENT DOCUMENTS

| | | | |
|---|---|---|---|
| 5,801,722 A * | 9/1998 | Ueda et al. ............... 347/16 |
| 6,047,110 A | 4/2000 | Smith ..................... 395/111 |
| 6,148,162 A | 11/2000 | Huston et al. ............ 399/66 |
| 6,335,084 B1 * | 1/2002 | Biegelsen et al. ........ 428/192 |
| 6,582,138 B1 * | 6/2003 | Meunier et al. .......... 400/103 |
| 6,598,783 B1 * | 7/2003 | Brinkman ............. 229/116.1 |
| 6,985,682 B1 * | 1/2006 | Haines et al. ............ 399/84 |
| 7,102,798 * | 9/2006 | Haines et al. ............ 358/471 |
| 2003/0072922 A1 * | 4/2003 | Haines .................... 428/195 |

* cited by examiner

*Primary Examiner*—Kimberly Williams
*Assistant Examiner*—Dillon Murphy

(57) ABSTRACT

The described arrangements and procedures pertain to configuring image forming devices to form images on various types of print media. Specifically, an imaging device sense data from a sheet of print media independent of whether a media marking comprising the data is imprinted on an edge or a face of a sheet of print media. The sensed media marking includes media parameter information corresponding to the sheet of print media. The imaging device retrieves the media parameter information from the sensed media marking to configure imaging operations.

12 Claims, 8 Drawing Sheets

SENSING MEDIA PARAMETER INFORMATION FROM MARKED SHEETS

TECHNICAL FIELD

The described subject matter relates to sensing media parameter information from print media.

BACKGROUND

Conventional imaging devices such as printers, plotters, copiers, facsimile machines and the like, typically utilize various types of print media to print images. Such print media types include paper based media (e.g., glossy paper, semi-glossy paper, matte paper, etc.) as well as non-paper based media (e.g., vellum, film, etc.).

To optimize print quality, an imaging device generally requires a number of parameters such as print modes, color maps, and/or the like, to be configured. This is because such parameters typically vary with the type of media being utilized. For example, an ink-based imaging device such as an ink jet printer that prints to an overhead transparency (OHT) designed for a laser printer may result in a print that not only may need to be re-imaged, but that also may result in gumming-up the internal assembly of the imaging device. This is because ink-based imaging devices use ink and laser-based OHTs do not generally have any ink retention coating. Accordingly, an ink-imaging device may adjust parameters such as printing speed, ink drying time, the amount of ink used, and/or the like, to suit the particular print media being used.

In yet another example, a laser-based imaging device such as a laser printer that prints on an ink-based OHT may melt the ink-based OHT because ink-based OHTs are not manufactured to withstand the amount of heat typically generated by a laser printer's image fusing process. As a result, the imaging job may not only need to be re-imaged, but the job may also result in the need to replace printer parts if the incompatible print media melted onto internal parts of the laser printer. Accordingly, a laser-imaging device may adjust parameters such as the speed of printing, ink-fusing temperature, biasing voltage, and/or the like, to suit the particular print media being used.

Some imaging devices need to be manually configured to properly operate based on the print media type that is going to be used. Thus, print media type information and instructions are typically written on a media box. However, many users do not read the box or the instructions that accompany the media. If the user re-installs the print media on another printer, the user is often required to either remember or guess the media type. This is because once the user removes the media from the box for installation into the device, the box is generally thrown away, and the media data type and/or other instructions are often lost.

Accordingly, a number of conventional techniques have been developed for an imaging device to identify the particular type of print media that is loaded into an imaging device. For example, U.S. Pat. No. 6,148,162 to Huston et al., assigned to the assignee hereof, and incorporated herein by reference, describes marking each sheet of print media with eight (8) separate indicia by imprinting the markings either on the face of each media sheet or on the side of each media sheet. I.e., two (2) barcodes are printed for detection either from each margin (top, right, bottom, and left) of the face of the print media or printed for detection from each edge (top, right, bottom, and left) of the print media. Such a conventional procedure to provide print media parameters to a printer has a number of disadvantages.

One disadvantage, for example, is that a printer that is designed to detect a barcode pattern from the face of print media typically cannot detect a barcode that is marked on the edge of print media. Analogously, a printer that is designed to detect a barcode pattern from the edge of print media typically cannot detect a barcode that is marked on the face of print media.

Unfortunately, print media is generally marked in some manner either exclusively on the face of the print media or exclusively on the edges of the print media. Thus, depending on whether media parameter information is marked on the side or face of print media, the printer may not be able to detect any media parameters from marked print media to properly configure its operation to form an image on the print media. Accordingly, certain stacks of print media are relegated to being properly imaged by a subset of all of the possible imaging devices that may have otherwise been able to form a proper image on the media.

Accordingly, the following described subject matter addresses these and other problems of conventional techniques to provide print media parameters to printing devices.

SUMMARY

The described arrangements and procedures pertain to configuring image forming devices to form images on various types of print media. Specifically, an imaging device sense data from a sheet of print media independent of whether a media marking comprising the data is imprinted on an edge or a face of a sheet of print media. The sensed media marking includes media parameter information corresponding to the sheet of print media. The imaging device retrieves the media parameter information from the sensed media marking to configure imaging operations.

DETAILED DESCRIPTION

Figure 1:
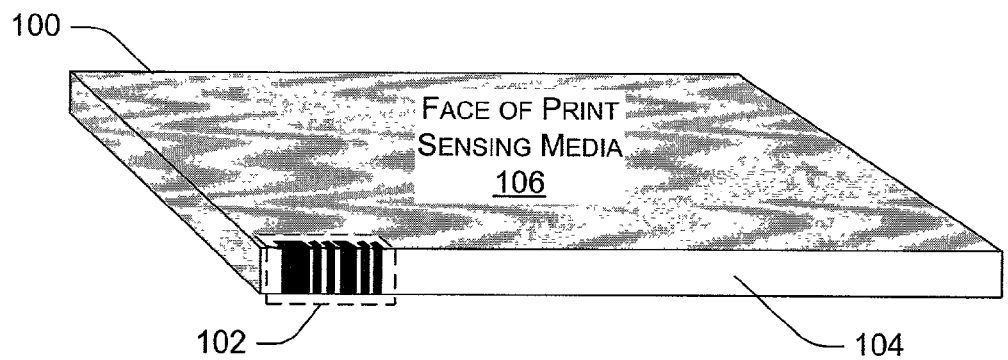
FIG. 1 shows an exemplary sheet of print media having an ink-bled media marking imprinted thereon.

FIG. 1 shows an exemplary sheet of print media having an ink-bled media marking (e.g., a barcode) imprinted thereon. The "ink" aspect of an ink-bled marking indicates only that it is a fluid-based marking that can be detected by a sensor coupled to an imaging device (e.g., the sensor 716 of the imaging device 612 of FIG. 7). The fluid-based marking is produced using any of a number of different fluids besides colored ink (e.g., non-visible ink, non-visible fluorescing ink, etc). In this configuration the ink-based marking is produced using non-visible fluorescing ink FIG. 1 shows an exemplary sheet of print media having an ink-bled media marking (e.g., a barcode) imprinted thereon. The "ink" aspect of an ink-bled marking indicates only that it is a fluid-based marking that can be detected by a sensor coupled to an imaging device (e.g., the sensor 716 of the imaging device 612 of FIG. 6). The fluid-based marking is produced using any of number of different fluids besides colored ink (e.g., non-visible ink, non-visible fluorescing ink, etc). In this configuration the ink-based marking is produced using non-visible fluorescing ink.

The sheet 100 includes a number of markings 102, each of which include media parameter information that corresponds to the sheet, such a brand name, a media name, a media type (e.g., paper, plastic, coated, etc.), size, thickness, weight, manufacturer, media form (e.g., labels, checks, envelopes, etc.), color table, device compatibility, speed at which the media can be fed into a device, fusing temperatures, drying time, valid orientations, duplex options, temperature and humidity ranges, surface roughness, wicking, quantity/length, reorder address, and/or the like. One or more of the markings 102 are sensed, or read by an imaging device to determine the media parameters that correspond to the sheet.

Figure 2:
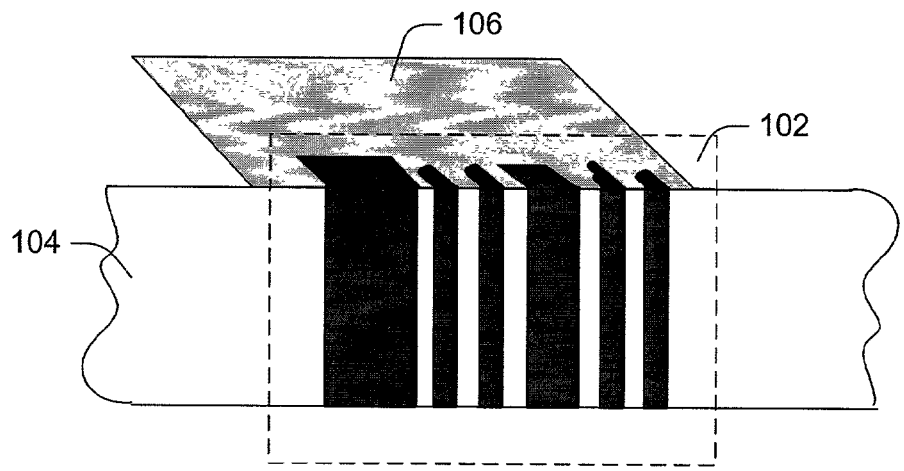
FIG. 2 shows further aspects of an exemplary sheet of print media having an ink-bled media marking imprinted thereon. Specifically, FIG. 2 enlarges the ink-bled media marking of FIG. 1 to illustrate that the ink-bled media marking in imprinted both on an edge of the sheet of print media as well as bled onto the face of the print media.

FIG. 2 shows further aspects of an exemplary sheet of print media 100 of FIG. 1 having an ink-bled media marking 102 imprinted thereon. Specifically, FIG. 2 enlarges the ink-bled media marking of FIG. 1 to illustrate that the ink-bled media marking is imprinted both on an edge 104 of the sheet of print media as well as bled onto the face of the print media. The ink that has bled onto the face of the print media is shown in the shaded portion of 106 that intersects with the dotted line that circumscribes the marking 102.

Figure 3:
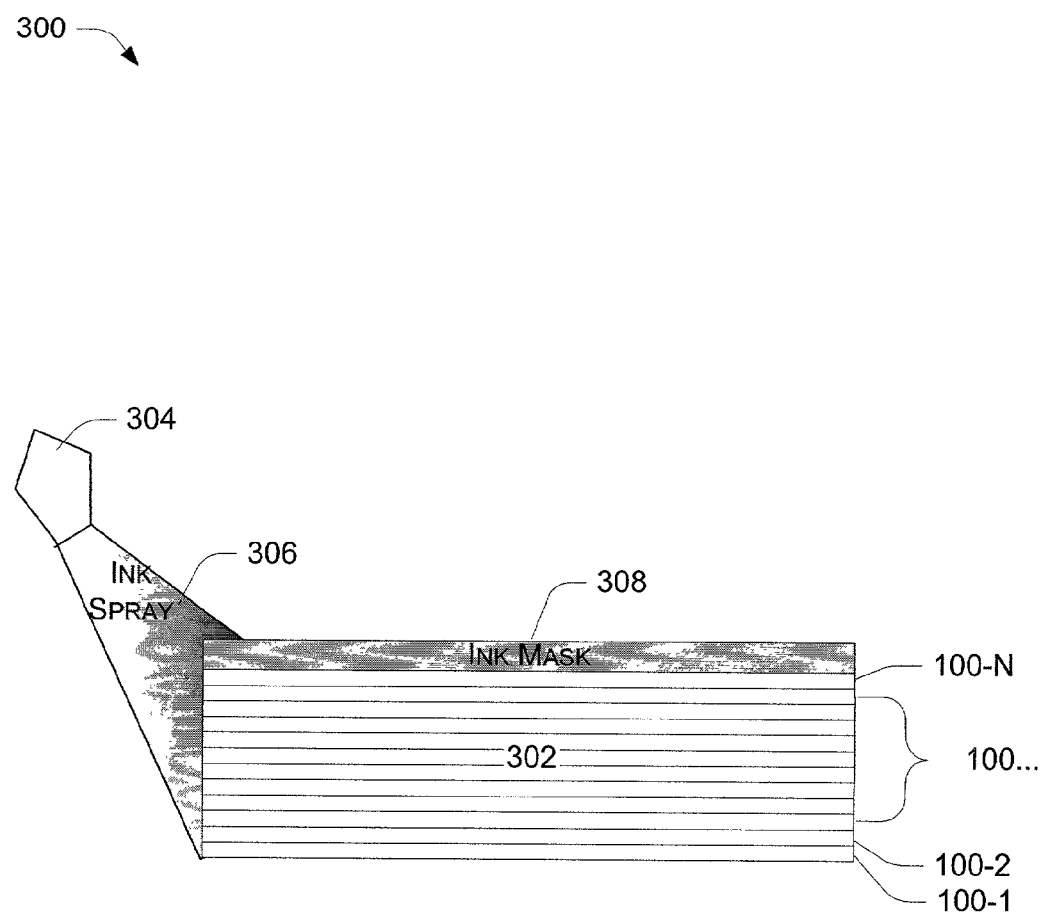
FIG. 3 shows an exemplary system to imprint ink-bled media markings onto a stack of print media that includes respective sheets of print media with sufficient ink-wicking properties.

FIG. 3 is a block diagram that shows an exemplary system 300 to imprint ink-bled media markings 102 of FIGS. 1 and 2 onto a stack of print media 302 that includes respective sheets of print media 100 with a sufficient ink-wicking property. A sheet of print media is in a stack such as a ream of print media just prior to being packaged. An ink nozzle 304 of a printing system directs an ink spray 306 using a mask such as a barcode mask (not shown) onto the respective exposed edges of each sheet in the ream. This technique forms exemplary ink-bled media markings 102 not only on the sprayed edges of the print media, but also on the faces 106 of the print media. Other methods besides spraying ink can be used to imprint the ink-bled markings onto the edges of the print media such as stamping the markings onto the edge of the ream, etc.

Figure 4:
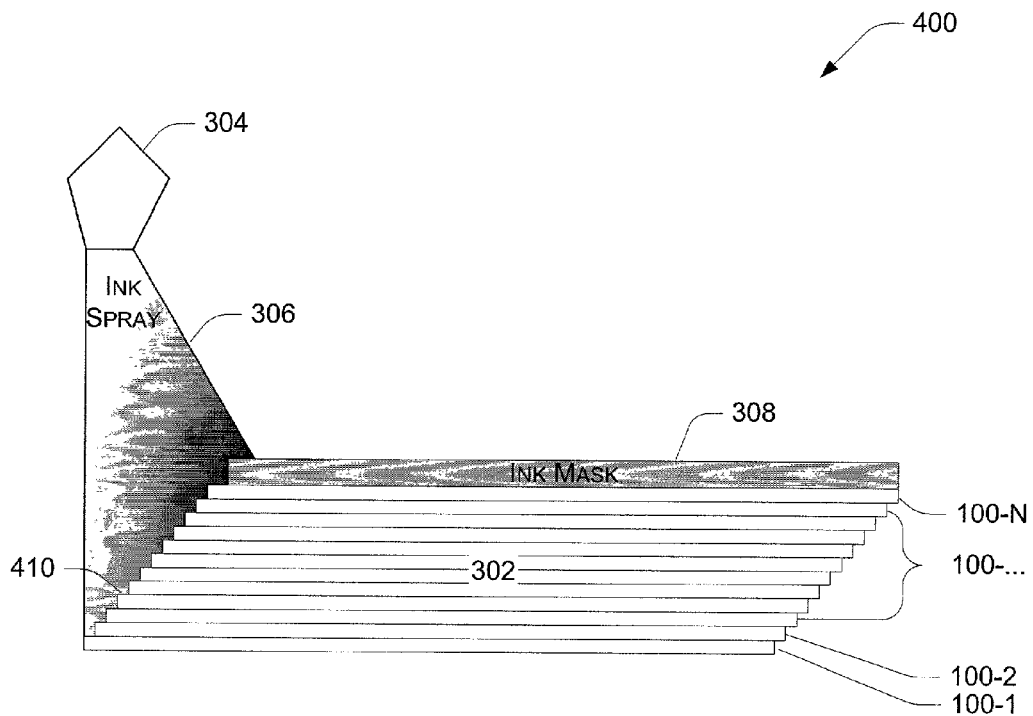
FIG. 4 shows an exemplary system to imprint ink-bled media markings onto a stack of print media that includes respective sheets of print media with low ink-wicking properties.

FIG. 4 is a block diagram that shows an exemplary system 400 to imprint ink-bled media markings 102 of FIG. 1 onto a stack of print media 100 that includes respective sheets of print media with low ink-wicking properties. For specialty print media 100 that do not have sufficient ink-wicking properties to carry imprinted ink from the edge of the print media to the face of the print media, the media stack 302 is skewed at an angle (see, angle 502 of FIG. 5) to expose a respective facial-portion (e.g., face portion 410) on each sheet in the stack. The angle of the skew determines how far into a sheet of print media that the "bleed" marking will extend after being imprinted with the ink-bled media marking.

If a sheet of print media 100 is a top sheet in a stack of print media, or if the sheet of print media is the only sheet of print media being marked with ink-bled indicia, the sheet of print media has an ink-mask 308 overlying the ink sheet. The mask is positioned such that it is substantially flush with the edge of the sheet that is being imprinted with the marking 102. The mask protects the face 106 of the sheet from being directly imprinted with the mark.

So far, the described bleeding aspect of ink 306 that is applied to a sheet of print media 100 is dependent on the wicking properties of the print media. In other words, the bleeding aspect of the marking 102 depends on the capillary action of the print media to carry imprinted ink from the edge 104 of the print media onto the face 106 of the print media. FIGS. 1 and 2 depict only a single face 106 of the print media with ink-bled indicia located thereupon. However, given that a particular sheet of print media typically has homogenous wicking properties throughout the sheet, it can be appreciated that a similar ink-bled media marking indicia is located onto the opposite face of the print media (not shown).

FIG. 4 is a block diagram that shows an exemplary system 400 to imprint ink-bled media markings 102 of FIG. 1 onto a stack of print media 100 that includes respective sheets of print media with low ink-wicking properties. For specialty print media 100 that do not have sufficient ink-wicking properties to carry imprinted ink from the edge of the print media to the face of the print media, the media stack 302 is skewed at an angle (see, angle 502 of FIG. 5) to expose a respective facial-portion (e.g., face portion 310) on each sheet in the stack. The angle of the skew determines how far into a sheet of print media that the "bleed" marking will extend after being imprinted with the ink-bled media marking.

In this exemplary configuration, the ink nozzle 304 directs ink spray 306 using a mask such as a marking mask (not shown) onto the exposed edges and face portions of each sheet of print media 100. Significantly, both the exposed edge and face portion are marked with an ink-bled media marking 102 responsive to a single imprinting action—in this example, the ink 306 that was directed to contact both the edge and face portions of the sheet is the single action. In other words, this imprinting action does not require a separate action to imprint a marking on the edge of the sheet and another completely different action to imprint a marking on the face of the sheet.

Although this example uses ink-spray 306 to imprint a marking, other techniques besides spraying ink can be used to imprint the ink-bled markings 102 onto the edges of the print media 100 such as stamping the markings onto the exposed portions of the sheets, etc.

Figure 5:
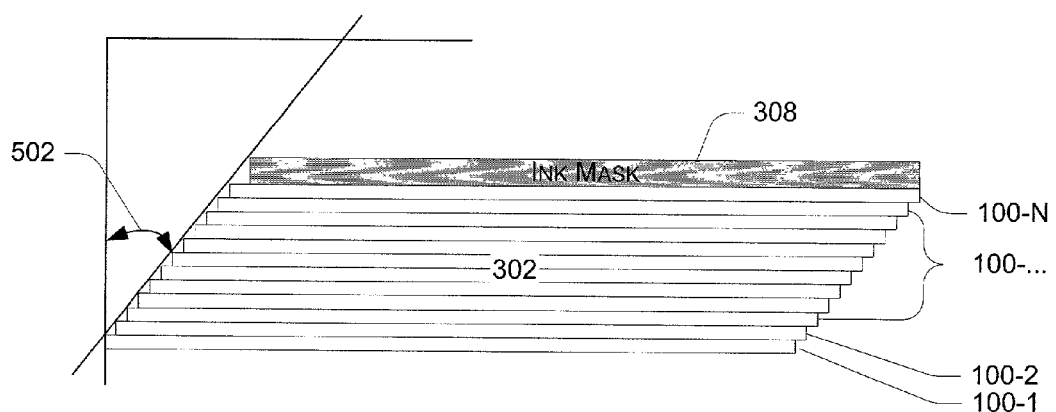
FIG. 5 shows a stack of print media, wherein individual sheets of the print media are offset with respect to one another at an exemplary angle of skew.

FIG. 5 is a block diagram that shows a stack of print media 302 wherein individual sheets of the print media 100 have been offset with respect to one another at an exemplary angle of skew 502. The angle of skew determines how far into a sheet of print media that an ink-bled marking (e.g., the marking 102 of FIGS. 1 and 2) will extend. For example, if the angle of skew is equal to zero (0), as illustrated in the marking example of FIG. 4, and if the print media do not have sufficient capillary action properties to carry the ink onto respective faces of the media, there will be no bleeding of the ink onto respective faces of the print media.

However, in this example, as the angle of skew 502 increases in size (e.g., from an angle of zero degrees (0°) to an angle of forty-five degrees (45°)), a larger portion (e.g., see the exposed facial-portion 410 of FIG. 4) of each sheet's respective face is exposed. Thus, during an imprinting process, the edge of each sheet in the stack is not only imprinted with a marking (e.g., marking 102 of FIGS. 1 and 2), but the exposed facial-portion of each sheet is also imprinted with the marking, regardless of whether each sheet's capillary action is insufficient to carry the ink from an edge to a face (a top or a bottom face).

An Exemplary Image Forming System

Figure 6:
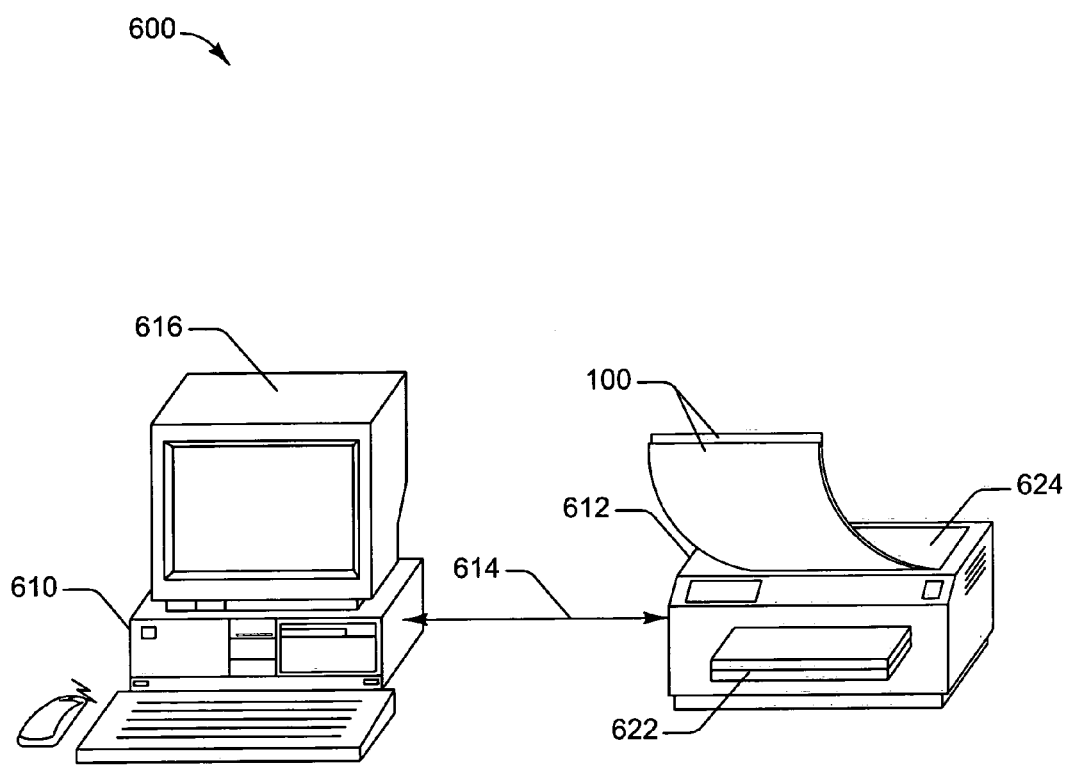
FIG. 6 shows an exemplary image forming system, which includes a host device, an image-forming device, and a communication medium operatively coupling the host device to the imaging device.

FIG. 6 is a block diagram of an exemplary image forming system 600, which includes a host device 610, an image-forming device 612, and a communication medium 614 operatively coupling the host device to the imaging device. The host device is implemented as a personal computer (PC), server, Web Server, or other device configured to communicate with image forming devices. The host device optionally includes a display 616 such as a CRT or flat-panel monitor to display information to a user.

An exemplary communication medium 614 includes a parallel connection, packet switched network, such as an intranet network (e.g., an Ethernet arrangement), and/or Internet, and other communication configurations operable to provide electronic exchange of information between the host device 610 and the image forming device 612 using an appropriate protocol. Other image forming system arrangements are possible including additional host devices and/or additional image forming devices coupled to the communication medium.

The image forming device 612 is configured to form images upon print media 100 of FIG. 1. One exemplary image-forming device is a printer, such as a laser printer, inkjet printer, a dot matrix printer, a dry medium printer, or a plotter. The described subject matter is embodied within other image forming device configurations such as multiple function peripheral devices, copiers, facsimile machines, plotters, and the like. The imaging device includes one or more print media supply bins 622, or trays into which print media are loaded.

The imaging device 612 is arranged to form images upon the print media 100 including, for example, paper, envelopes, transparencies, labels, etc. Print media may be in a number of different forms such as a stack, or a ream of print media. Different types of print media have various weights, surface finishes, roughness, wicking properties, etc., which impact equality of images formed thereupon by the imaging device.

In this example, each sheet of print media 100 that is loaded into a media bin 622 includes media parameter information on an ink-bled marking (e.g., the ink-bled marking 102 of FIGS. 1 and 2). The print media shown in the output bin 624 has already presented the imaging device with a number of media parameters in respective ink-bled media markings to configure the device's imaging operations. An exemplary procedure for an imaging device to sense and configure its operating parameters based on media parameter information provided by ink-bled media markings is described in greater detail below in reference to FIG. 9.

An Exemplary Image Forming Device

Figure 7:
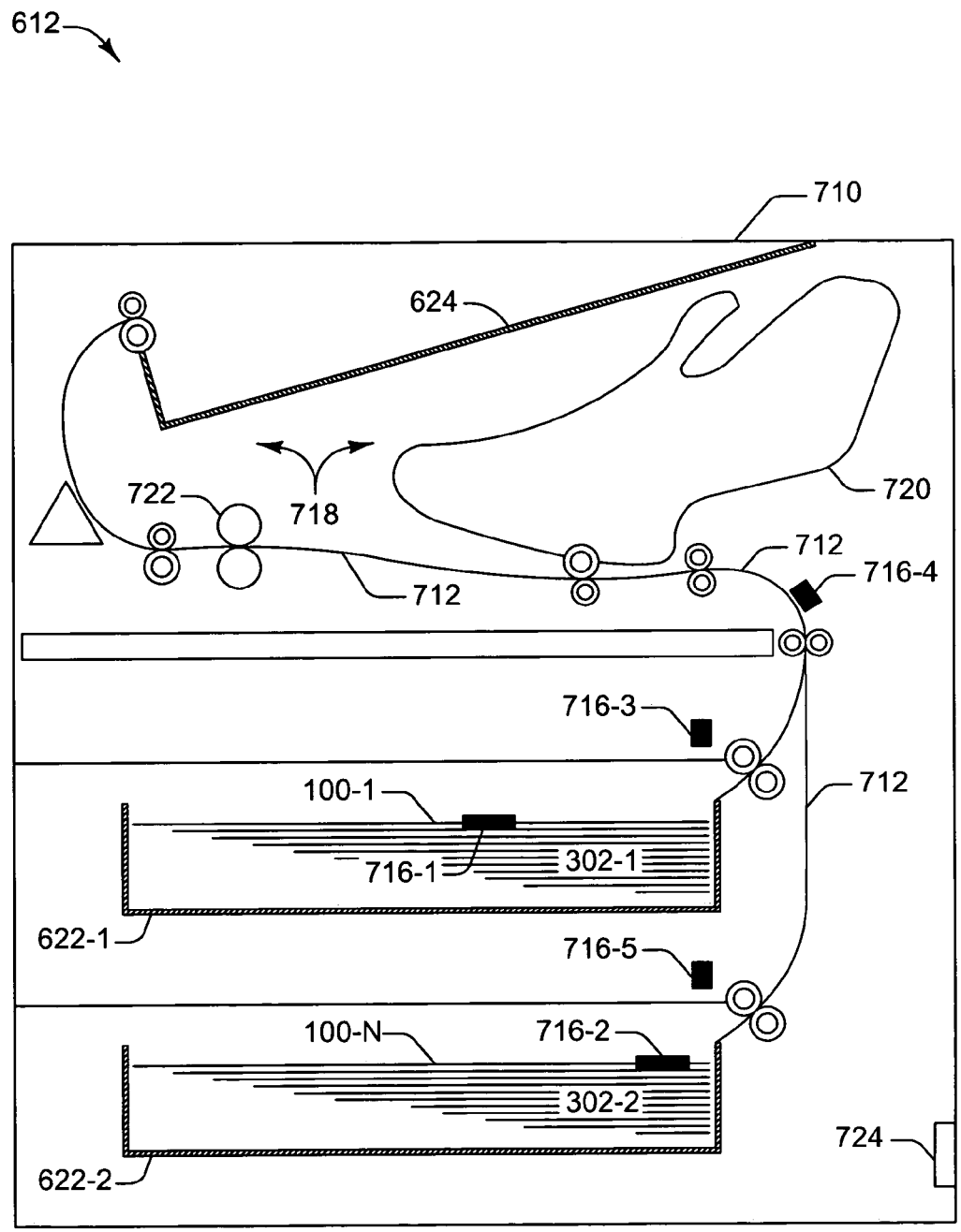
FIG. 7 shows further details of an exemplary arrangement of an image forming device of FIG. 6.

FIG. 7 is a block diagram that shows further details of an exemplary arrangement of image forming device 612 of FIG. 6. The image-forming device includes a housing 710 arranged to define a media path 712 to guide media within the housing. For example, a plurality of rollers is arranged within the housing to define the media path and to direct print media 100 (see, print media sheet 100 of FIG. 1) from one or more media supplies 622 (see, also media supply trays 622 of FIG. 6) to an output tray 624 (see, also output tray 624 of FIG. 6). In this configuration, the media is loaded sheet-by-sheet from the stack by the rollers.

In the depicted arrangement, the device 612 includes a plurality of media supplies 622. A first and second media supply 622-1 and 622-2 include respective stacks 302, or reams of print media. Each sheet 100 in the stack has at least one ink-bled media marking (e.g., the marking 102 of FIGS. 1 and 2) imprinted on at least one edge and at least one facial portion of the sheet. The facial portion is adjacently positioned and corresponds to the marking that is imprinted on the edge. Each respective marking has data thereon that is used by the device 612 to configure itself to form images upon the print media. The data read from an ink-bled marking as a sheet is picked from the stack and read by a sensor 716 that is described in further detail below.

The exemplary image-forming device 612 further includes an image engine 718 adjacent media path 712 and arranged to print or otherwise form images upon media 100. An exemplary image engine includes a print engine including a developing assembly 720 and a fusing assembly 722 in the depicted configuration. Control circuitry of the device is configured to control operations of device 612 including controlling operations of developing and fusing assemblies 720 and 722 as described in further detail below.

The image-forming device 612 includes one or more marking sensors 716 (e.g., an optical sensor) configured to read data within one or more markings 102 of FIG. 1 that is/are imprinted on a media sheet 100. Such indicia are positioned on each print media sheet such that they can be sensed from any orientation as long as a sensor is properly positioned to sense the indicia. Accordingly, plural configurations of sensor 716 are possible.

For example, a sensor (e.g., sensors 716-1, 716-2, 716-3, and/or 716-5) can be located adjacent to a media bin 622 to read the next item to be imaged upon before the sheet of print media 100 has been committed to the paper path 712. Or, a sensor (e.g., sensor 716-4) can be located at a point just beyond the edge of the media bin, wherein the sensor can read the ink-bled marked indicia from a sheet after the sheet of print media has been committed to the paper path without blocking the paper path.

If a sensor (e.g., sensors 716-1, 716-2, 716-3, and/or 716-5) is positioned to read ink-bled marked indicia from the sheet of print media before the sheet 100 has been committed to the paper path 712, the imaging device 612 provides the information that is in the marked indicia (e.g., paper sizes and types like glossy paper, transparencies, etc.) to a user. Moreover, if the sensor is positioned to detect the marked indicia from the sheet of print media before the sheet has been committed to the paper path, the imaging device can use the detected information to determine an appropriate media supply bin from which to pull the print media sheet to be imaged upon.

A detector 716 can be positioned flush to a face of the print media (e.g., the front and/or back face 106 of the sheet 100 of FIG. 1) and the detector can be positioned flush with the edge 104 of the sheet. Depending upon which of these two orientations is used to position the detector, the detector will either be able to read markings (e.g., the ink-bled marking indicia 102 of FIG. 1) from the face or from the edge 104 of the print media, but will not typically be able to read markings from both the face and/or the edge of the sheet of print media. Thus, it is advantageous to set the position of the detector in a manner that is angled between the face and the edge of the print media so that the sensor can detect marked indicia from the face and/or the edge of the sheet of print media. (Such an advantageous positioning is described in greater detail below in reference to FIG. 8).

Image forming device 612 includes an interface 724 configured to couple with a communications medium (e.g., the communication media 614 of FIG. 6) for implementing communications externally of device 612 with host device 610 or other external devices. Interface 724 receives image data from the communication medium and the imaging device subsequently forms images upon print media 100 using image data received via interface 724. In one configuration, interface 724 is implemented as a JetDirect ® card that is available from Hewlett-Packard Company.

Figure 8:
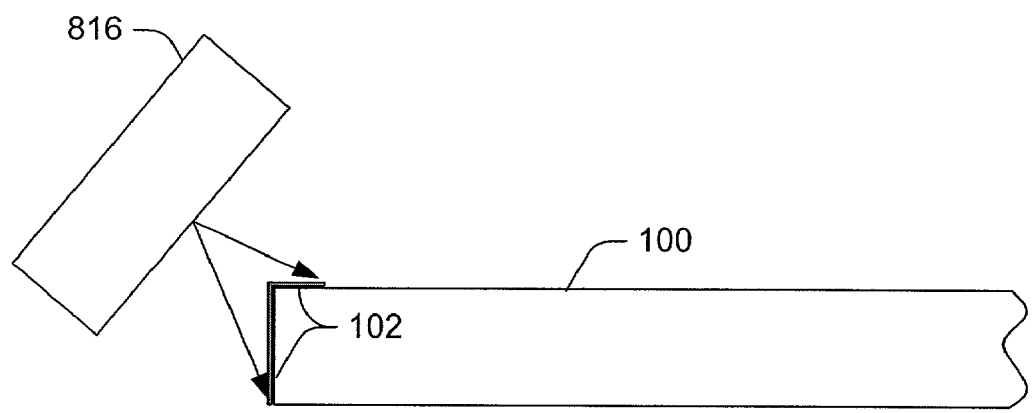
FIG. 8 shows a sensor that is positioned at an angle between a face and an edge of a sheet of print media such that so the sensor detects ink-bled marked indicia from the face and/or the edge of the sheet of print media.

FIG. 8 is a block diagram that shows a sensor 816 that is positioned at an angle between a face and an edge of a sheet of print media 100 such that the sensor detects ink-bled marked indicia 102 from the face and/or the edge of the sheet of print media.

Figure 9:
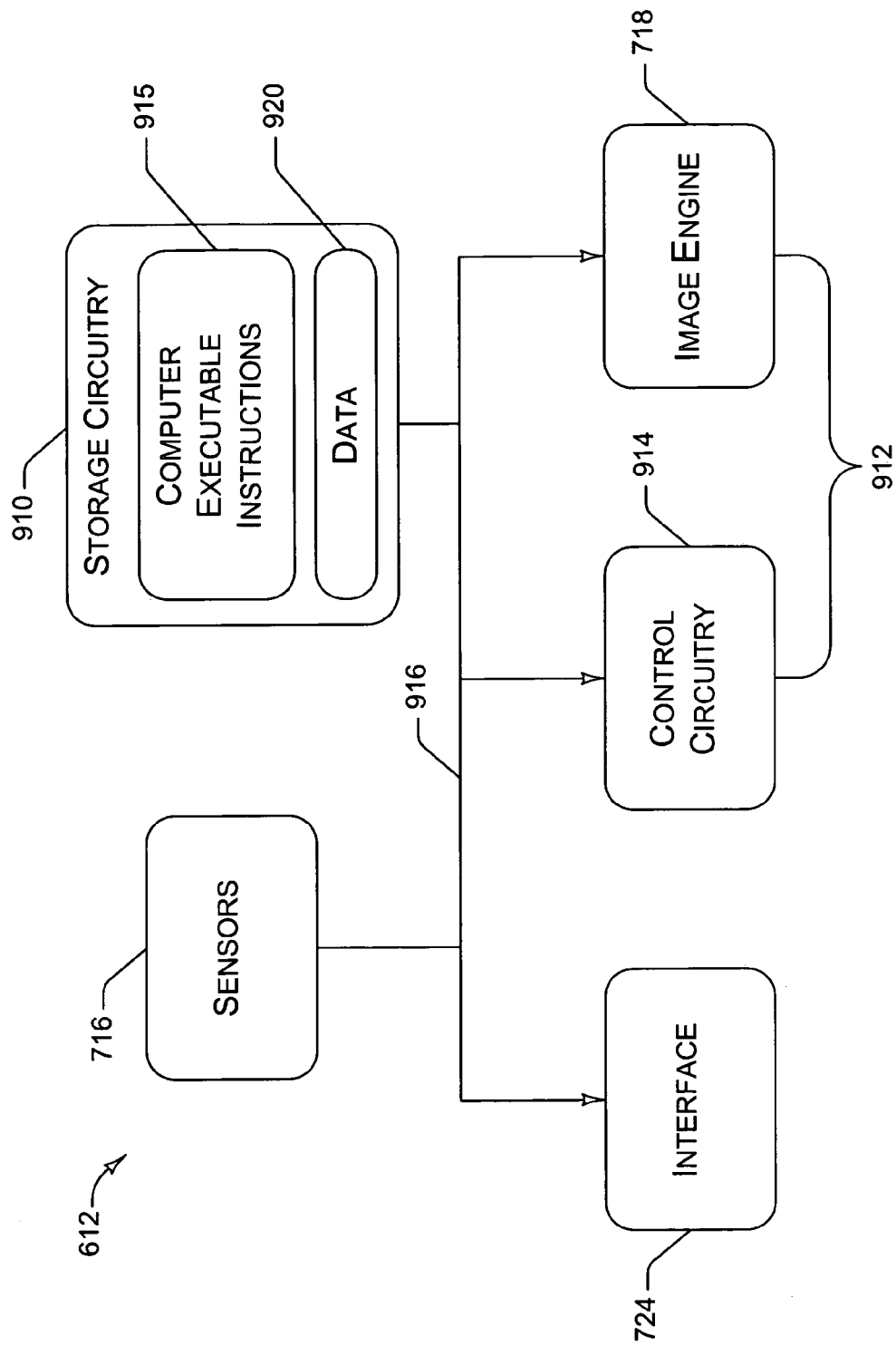
FIG. 9 shows exemplary electrical components to control operations of an image forming device of FIGS. 4, 6 and 7.

FIG. 9 is a block diagram that shows exemplary electrical components to control operations of an image forming device of FIGS. 4, 6 and 7. The depicted electrical circuitry includes sensors 716, interface 724, storage circuitry 910 and imaging circuitry 912 (imaging circuitry 912 includes control circuitry 914 and image engine 718 comprising assembly's 720 and 722 of FIG. 7). Further a communication medium 916 configured to implement appropriate communications is provided intermediate internal components of image forming device 612. In one arrangement, communication medium 916 is implemented as a bi-directional bus.

Storage circuitry 910 is configured to store electrical information such as image data 920 for using and formulating hard images and instructions 915 usable by control circuitry 914 for implementing image-forming operations within device 612 of FIGS. 6 and 7. Exemplary storage circuitry includes nonvolatile memory (e.g., flash memory, EEPROM, and/or read-only memory (ROM)), random access memory (RAM), and hard disk and associated drive circuitry.

Control circuitry 914 implements processing of image data (e.g., rasterization) received via interface 724. Further, control circuitry 914 of imaging circuitry 912 performs functions with respect to the formation of images including controlling operations of image engine 718 including developing assembly 720 and fusing assembly 722 in the described configuration. For example, control circuitry 914 obtains data via appropriate signals from one or more of sensors 716 and adjusts imaging parameters of image engine 718 during formation of images.

An exemplary configuration of control circuitry 914 is implemented as a processor such as a dedicated microprocessor configured to fetch and execute computer-executable instructions 915 that are stored in storage circuitry 910. The control circuitry is also configured to fetch data 920 from the storage circuitry during the execution of the computer-executable instructions. The computer-executable instructions configure the image-forming device 612 according to the type of print media 100 being imaged upon.

For example, different types of media 100 of FIG. 1 have various weights, surface finishes, roughness, wicking properties, etc., which impact equality of images formed thereupon. The imaging parameters of device 612 including those of image engine 718 are adjusted by the control circuitry 914 in conjunction with the computer-executable instructions 915 to optimize the formation of quality images upon media 100 responsive to the types of media utilized as indicated by the ink-bled data (e.g., ink-bled marking 102 of FIGS. 1 and 2) imprinted on a media sheet 100.

In one configuration, storage circuitry 910 is configured to store a plurality of settings for one or more imaging parameters corresponding to a plurality of respective media types. Such settings are identified, for example, in a lookup table (not shown) within data 920. Upon detecting, by a sensor 716, of the media parameter information in an ink-bled marking 102 that is imprinted on a media sheet 100, the appropriate media parameters are obtained by control circuitry 914 for configuring device 612. The parameters settings may be used directly to configure device 612 or for providing initial settings which may be subsequently modified based on other information to optimize imaging.

Exemplary Procedure Using Media Parameter Marking Sheet

Figure 10:
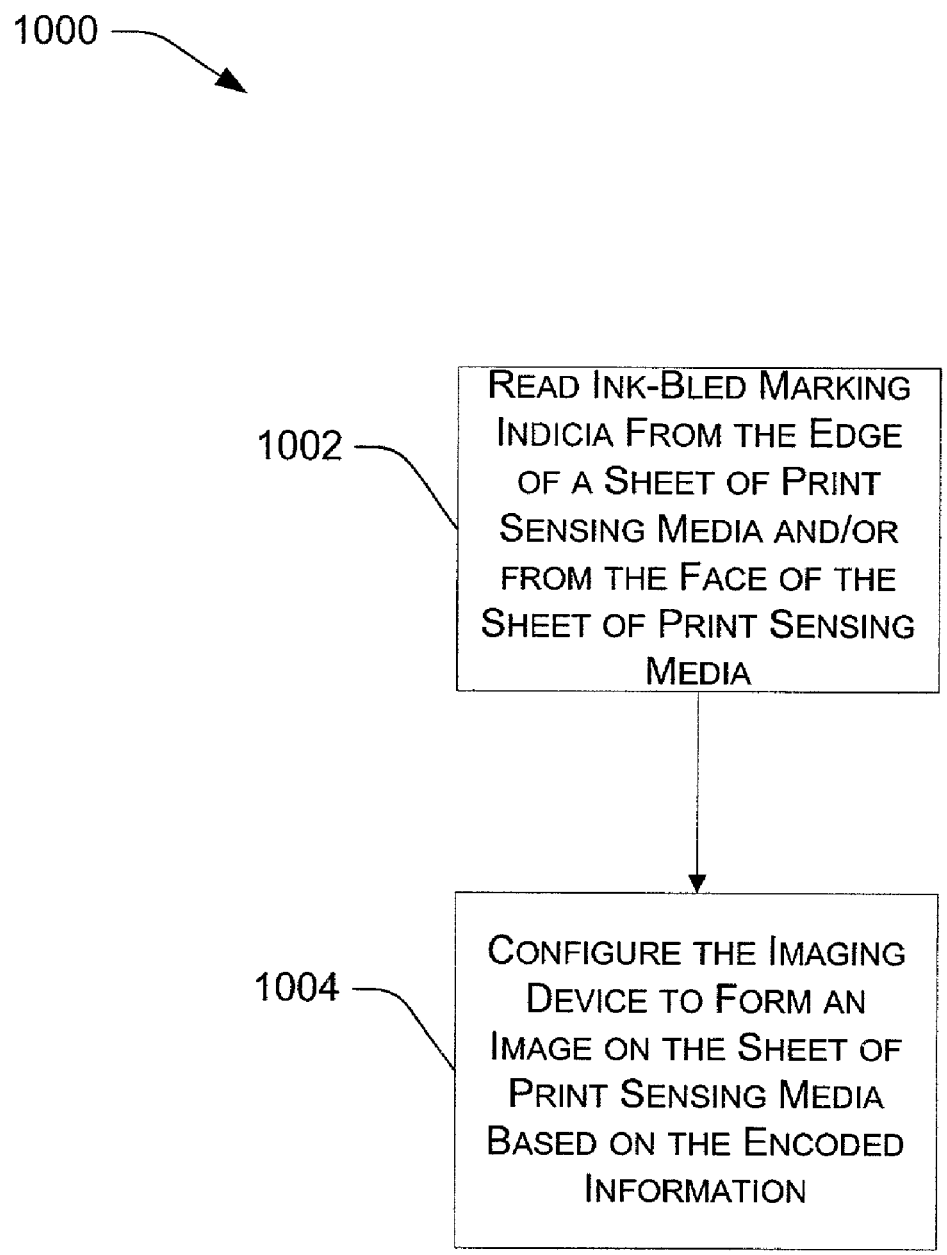
FIG. 10 shows an exemplary procedure to optimize imaging device operations based on detecting at least one ink-bled media marking that is imprinted on a sheet of print media.

FIG. 10 is a flowchart that shows an exemplary procedure 1000 to optimize imaging device operations based on detecting at least one ink-bled media marking (e.g., markings 102 of FIGS. 1 and 2) that is imprinted on a sheet of print media 100. At block 1002, an imaging device (e.g., device 612 of FIGS. 6, 7 and 9) detects information from an ink-bled media marking that is imprinted on an edge of a sheet of print media. At block 1004, the imaging device uses the detected information to configure image-forming operations to form an image on the sheet of print media 100.

Conclusion

Although the subject matter has been described in language specific to structural features and/or methodological operations, it is to be understood that the subject matter defined in the appended claims is not necessarily limited to the specific features or operations described. Rather, the specific features and operations are disclosed as preferred forms of implementing the claimed invention.

The invention claimed is:

1. A method for sensing data from a sheet of print media, the method comprising:
   an imaging device sensing a media marking on a face of a sheet of print media if the media marking is imprinted on the face of the sheet and sensing a media marking on an edge of a sheet of print media if the media marking is imprinted on the edge of the sheet, the media marking comprising media parameter information that corresponds to the sheet of print media; and
   configuring the imaging device based on the media parameter information to form an image on the sheet of print media.

2. A method as recited in claim 1, wherein the media marking is an ink-bled media marking.

3. A method as recited in claim 1, further comprising:
   determining whether to pull the sheet of print media from a particular media supply bin based on the media parameter information.

4. A method as recited in claim 1, further comprising:
  determining if an appropriate print media is available in the imaging device to perform a particular imaging job based on the media parameter information.

5. A computer-readable medium comprising computer-executable instructions for sensing data from a sheet of print media, the computer-executable instructions comprising instructions for:
  an imaging device sensing a media marking on a face of a sheet of print media if the media marking is imprinted on the face of the sheet and sensing a media marking on an edge of a sheet of print media if the media marking is imprinted on the edge of the sheet, the media marking comprising media parameter information that corresponds to the sheet of print media; and
  configuring the imaging device based on the media parameter information to form an image on the sheet of print media.

6. A computer-readable medium as recited in claim 5, wherein the media marking is an ink-bled media marking.

7. A computer-readable medium as recited in claim 5, wherein the computer-executable instructions further comprise instructions for:
  determining whether to pull the sheet of print media from a particular one bin of a plurality of media supply bins based on the media parameter information.

8. A computer-readable medium as recited in claim 5, wherein the computer-executable instructions further comprise instructions for:
  determining if an appropriate print media is available in the imaging device to perform a particular imaging job based on the media parameter information.

9. An imaging device comprising:
  a memory comprising computer-executable instructions for sensing data from a sheet of print media; and
  a processor that is operatively coupled to the memory, the processor being configured to fetch and execute the computer-executable instructions from the memory. the computer-executable instructions comprising instructions for:
  sensing a media marking on a face of a sheet of print media if the media marking is imprinted on the face of the sheet and sensing a media marking on an edge of a sheet of print media if the media marking is imprinted on the edge of the sheet, the media marking comprising media parameter information that corresponds to the sheet of print media; and
  configuring the imaging device based on the media parameter information to form an image on the sheet of print media.

10. An imaging device as recited in claim 9, wherein the media marking is an ink-bled media marking.

11. An imaging device as recited in claim 9, wherein the computer-executable instructions further comprise instructions for:
  determining whether to pull the sheet of print media from a particular one bin of a plurality of media supply bins based on the media parameter information.

12. An imaging device as recited in claim 9, wherein the computer-executable instructions further comprise instructions for:
  determining if an appropriate print media is available in the imaging device to perform a particular imaging job based on the media parameter information.

* * * * *

UNITED STATES PATENT AND TRADEMARK OFFICE
CERTIFICATE OF CORRECTION

| | | |
|---|---|---|
| PATENT NO. | : 7,142,324 B2 | Page 1 of 1 |
| APPLICATION NO. | : 09/981275 | |
| DATED | : November 28, 2006 | |
| INVENTOR(S) | : Robert B. Haines | |

It is certified that error appears in the above-identified patent and that said Letters Patent is hereby corrected as shown below:

In column 4, lines 4-16, delete "FIG. 4 is a block diagram..........ink-bled media marking.".

In column 4, line 46, delete "310" and insert --410--, therefor.

In column 10, line 6, in Claim 9, delete "memory." and insert --memory,--, therefor.

Signed and Sealed this

Twenty-eighth Day of April, 2009

JOHN DOLL
*Acting Director of the United States Patent and Trademark Office*